United States Patent [19]

Shauger

[11] 4,409,660
[45] Oct. 11, 1983

[54] ELECTRONIC TOTALIZER

[75] Inventor: Herbert A. Shauger, Doylestown, Pa.

[73] Assignee: Fischer & Porter Company, Warminster, Pa.

[21] Appl. No.: 240,229

[22] Filed: Mar. 3, 1981

[51] Int. Cl.³ .............................................. G01G 9/00
[52] U.S. Cl. ...................................... 364/510; 377/21
[58] Field of Search ................. 364/510, 814, 752; 235/92 DM, 92 FL, 92 CV

[56] References Cited

U.S. PATENT DOCUMENTS

| | | | |
|---|---|---|---|
| 3,653,015 | 3/1972 | Rock | 235/92 CV X |
| 3,840,724 | 10/1974 | Tripp | 235/92 CV X |
| 3,854,038 | 12/1974 | McKinley | 235/92 FL X |
| 3,895,377 | 7/1975 | Schwalenstocker | 235/92 CV X |
| 3,965,344 | 6/1976 | Romo | 364/814 X |
| 3,967,105 | 6/1976 | Harrington | 364/814 X |
| 3,987,366 | 10/1976 | Redman | 364/814 X |
| 3,991,303 | 11/1976 | Siegel | 235/92 FL X |
| 3,996,453 | 12/1976 | Coia | 235/92 DM X |
| 4,041,289 | 8/1977 | Brosh et al. | 235/92 CV X |
| 4,105,138 | 8/1978 | Lehmann | 235/92 FL X |

Primary Examiner—Edward J. Wise
Attorney, Agent, or Firm—Michael Ebert

[57] ABSTRACT

An electronic totalizer having a non-destructive readout indicative of the time-integrated total of a process variable such as flow rate, metered by a transducer whose output signal lies within a predetermined current range. In the totalizer, the transducer signal is converted into a proportional voltage signal that is applied to a voltage-to-frequency converter yielding pulses at a rate which varies with the magnitude of the voltage signal, the pulse frequency being high at the upper limit of the range. The converter pulses are fed to an adjustable scaler yielding output pulses at a scaled-down rate appropriate to the desired unit of measurement, these being applied to a counter which gives a totalized reading. By setting the scaler, one may establish a reading in useful increments of process flow, such as gallons or liters.

11 Claims, 3 Drawing Figures

ELECTRONIC TOTALIZER

BACKGROUND OF INVENTION

The invention relates generally to electronic totalizers, and more particularly to a totalizer that incorporates adjustable scaling means making it possible to establish output increments in units appropriate to the use to which the totalizer is put, such as units in terms of gallons, liters or tons.

While a totalizer in accordance with the invention is usable in conjunction with any form of transducer responsive to a process variable to produce an output signal in a standard industrial process control range, such as 4 to 20 mAdc, the totalizer will be described in the context of a two-wire transmitter that includes a field-mounted transducer for converting a process variable, such as liquid level or flow rate, into a signal lying within a standard current range. This signal is conveyed over the two-wire line to a remote receiving station in which the signal is indicated or recorded, or used to operate process controllers. An important advantage of a two-wire transmitter is that the line which conveys the current signal from the field transducer to the remote station also acts to deliver d-c power from a power supply at the station to the transducer, thereby obviating the need for extra power lines.

In many industrial applications for a two-wire transmitter, the output value in rate form must be totalized for billing or other purposes to determine the total flow that has passed through the meter. In the Shauger et al. U.S. Pat. No. 4,158,765, whose entire disclosure is incorporated herein by reference, an electronic totalizer is disclosed for use in conjunction with a two-wire transmitter whereby the line carrying current from the transducer to the remote receiving station also supplies power to the totalizer as well as to the transducer. The totalizer provides a non-destructive readout of the metered variable, yet its operation has no adverse effect on the normal behavior of the transmitter.

The input circuit of the Shauger et al. totalizer includes a resistor through which the line current signal passes to produce a proportional voltage which is applied to a resettable integrator yielding a time-integrated voltage that rises above a base level at a rate depending on the varying magnitude of the voltage applied thereto. This time-integrated voltage is fed by a comparator set by a reference voltage to produce an output signal only when the integrated voltage reaches a threshold. The output signal generated by the comparator is fed back to the integrator to reset it to base level and it is also applied on a trigger to a one-shot to produce a pulse. The pulse is applied to a digital counter whose accumulated count represents the time-integrated total of the metered variable.

Thus if the meter measures the flow rate of a process liquid, the Shauger et al. totalizer will produce, say, one output pulse for every 100 gallons of flow. When, therefore, the count reads 30, this simply means that a total of 3000 gallons has passed through the flowmeter.

Though the Shauger et al. totalizer has many advantages over prior art totalizers, it lacks the ability to scale its output digitally to any desired rate. Thus if the totalizer is arranged to totalize flow in terms of gallon units, one is not able, at will, to readjust the totalizer to provide a readout in liters, in tons or in other measuring units.

SUMMARY OF INVENTION

In view of the foregoing, the main object of this invention is to provide an electronic totalizer whose readout indicates the time-integrated total of the metered process variable, the totalizer including adjustable means making it possible for an operator to set the output digitally to any desired rate to facilitate billing and other rate-related functions.

More particularly, an object of this invention is to provide a totalizer for a two-wire transmitter which includes an adjustable binary scaler to establish output increments in meaningful units of flow or other process variable.

Also an object of this invention is to provide a totalizer which operates efficiently and reliably, and which affords a non-destructive readout of the time-integrated total of a 4 to 20 mAdc process signal.

A significant feature of the invention resides in the fact that the totalizer includes a square root capability, so that should the process signal reflect the square of flow, as is the case with a differential pressure transducer, then the totalizer may be operated to integrate the square root of the input signal.

Briefly stated, these objects are attained in an electronic totalizer in accordance with the invention adapted to display the time-integrated total of a process variable metered by a transducer whose output signal lies within a predetermined standard current range.

In the totalizer, the transducer signal is converted into a proportional voltage signal which is applied to a voltage-to-frequency converter yielding pulses at a rate which varies with the magnitude of the voltage signal, the pulse frequency being relatively high at the upper limit of the range. The converter pulses are applied to an adjustable digital scaler yielding output pulses at a scaled-down rate appropriate to the desired unit of measurements. These pulses are applied to a counter which affords a totalized reading. By setting this scaler, one may establish a reading in useful increments of process flow, such as gallons, liters or tons.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
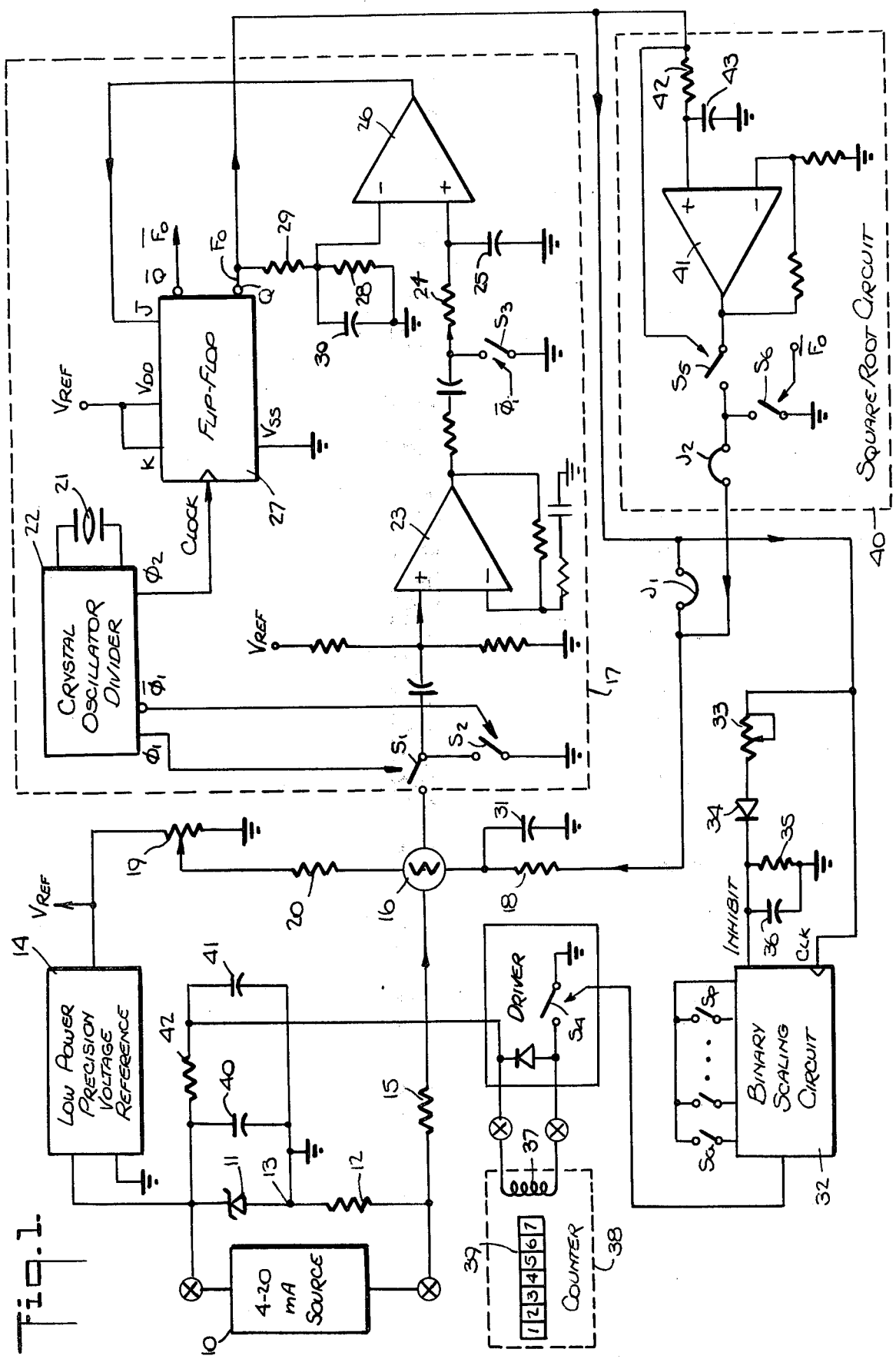
FIG. 1 is a schematic diagram of a preferred embodiment of an electronic totalizer in accordance with the invention.

Totalizer:

Referring now to FIG. 1, there is shown a totalizer in accordance with the invention associated with a transducer of conventional design. In practice, the transducer may be a field-mounted electromagnetic flowmeter or other instrument responsive to a process variable. Transducer 10, which acts to meter the process variable, generates an output signal generally in the standard 4 to 20 mAdc current range. Thus in the case of flow rate measurement, the higher the output current, the greater the prevailing flow rate, 20 mA being the upper end of the scale.

The input circuit of the totalizer is constituted by a zener diode 11 connected in series with a fixed resistor 12. Transducer current passes through diode 11 to produce a constant voltage drop thereacross, and through resistor 12 to produce a voltage signal proportional to the incoming current signal. The usefulness of this circuit is enhanced by keeping the total voltage drop as low as is feasible so that, if necessary, other loads may be interposed in the 40 to 20 mAdc loop.

A circuit common potential is established at point 13, which is the junction of resistor 12 and diode 11. A precise temperature-stable reference is established with respect to common by reference 14 connected across zener diode 11 to provide a low-power precision reference voltage $V_{REF}$.

The voltage signal developed across fixed resistor 12 is conveyed by resistor 15 to a virtual ground summing junction 16, the output of which is applied to the input of a voltage-to-frequency converter whose components are enclosed in block 17. The output of converter 17 is fed back to junction 16 through a feedback resistor 18. Also applied to junction 16 through an adjustable resistor 19 and resistor 20 connected to reference 14 is an adjustable bias voltage. The circuit operation is such as to bring about equality between the sum of currents through resistors 18 and 20 with the input current supplied through resistor 15, whereby junction 16 will then operate at circuit common potential. The 4 mA bias level of the input is removed by resistors 19 and 20 and the reference voltage.

Voltage-to-frequency converter 17 includes a crystal oscillator 21 and multi-stage frequency divider circuit 22 operating in conjunction therewith. In an actual embodiment, the oscillator has a stable frequency of 240 KHz. Divider circuit 22 yields a relatively low frequency $\phi_1$ signal and its complement $\bar{\phi}_1$, as well as a clock frequency signal $\phi_2$. Signal frequencies $\phi_1$ and $\bar{\phi}_1$ are applied as drive signals to actuate electronic switches $S_1$ and $S_2$, respectively, which function in phase-opposition as a d-c to a-c modulator. In this way, the d-c output of the summing junction is converted into a corresponding a-c signal.

Any change in the output of summing junction 16 gives rise to a change in the a-c output of the modulator formed by switches $S_1$ and $S_2$. This output is applied to an amplifier 23 whose output is synchronously demodulated by an electronic switch $S_3$ and components associated therewith. Switch $S_3$ is driven at the complement frequency $\bar{\phi}_1$ taken from divider 22. Thus d-c amplifier offset drifts are eliminated if the gain of amplifier 23 is sufficiently high.

Figure 2:
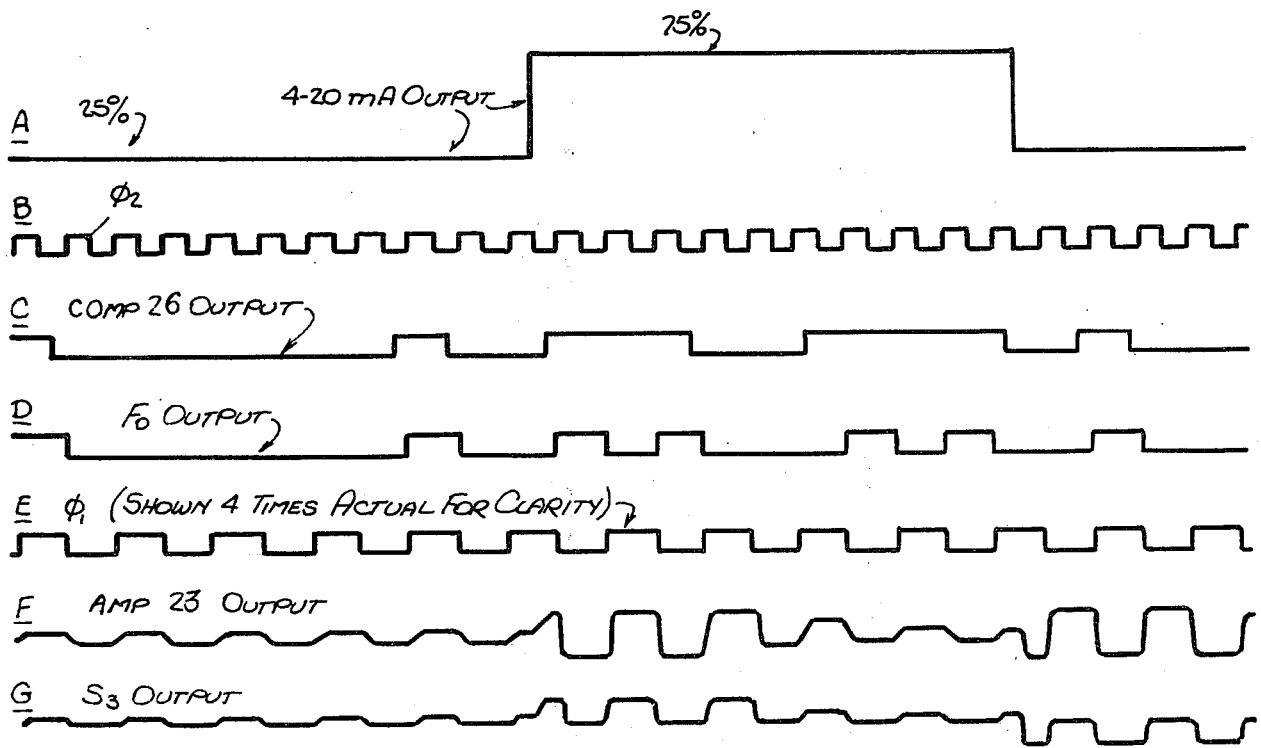
FIG. 2 is a timing diagram explanatory of the operation of the totalizer.

In FIG. 2, the timing diagram in line A shows a step change in the 4 to 20 mAdc input to the totalizer, the step being from 25% to 75%. The timing relationship of this step change to the output of amplifier 23 is shown on line F and to the output of demodulator switch $S_3$ is shown on line G.

The d-c recovered by demodulator switch $S_3$ is filtered by a filter network formed by resistor 24 and capacitor 25 and fed to the plus (+) or non-inverting terminal of a differential amplifier 26 acting as a comparator. The comparator output is applied to the J terminal of a master-slave CMOS (J-K) flip-flop 27. Reference voltage $V_{REF}$ is applied to the K terminal, the flip-flop having the clock pulses $\phi_2$ from the divider applied to its clock terminal.

An increase in input signal to the totalizer will cause a more positive signal to be developed across capacitor 25 at the + input of comparator 26, thereby forcing its output high if the voltage at the + input exceeds that on its negative (−) input terminal. When the output of comparator 26 is high, this renders the J terminal of flip-flop 27 high, causing the flip-flop to change at every positive edge of its $\phi_2$ clock.

If, however, a low logic level is present at the output of comparator 26, then the output of the flip-flop at its output terminal Q (whose output is designated $F_o$) will assume a low logic level on the positive clock edge. This activity is illustrated in line D of the timing diagram in FIG. 2. In this diagram, line B shows the pulse form of frequency $\phi_2$; line E shows the pulse form of frequency $\phi_1$; and line C the output of comparator 26.

The $F_o$ output of flip-flop 27 is attenuated by resistor 28 in series with resistor 29 to permit small inputs to bring about a full-scale change. The voltage developed across resistor 28 is smoothed by a shunt capacitor 30 and applied to the negative input (−) of comparator 26. The time constant of this R-C circuit is such as to permit comparator 26 to change state at the maximum output frequency.

Since flip-flop 27 is a CMOS device, its logic output levels will reside at either one of its supply voltages $V_{DD}$ and $V_{SS}$, the former being at the level of reference voltage $V_{REF}$, and the latter at circuit common. Thus the current fed back to the summing junction by resistor 18 from the flip-flop Q terminal is precisely related to the reference voltage and the duty cycle of the flip-flop $F_o$ output. Moreover, the width of each pulse at $F_o$ will be precisely equal to a multiple of one period of the crystal oscillator, whereby ensuring an extremely stable pulse width over wide temperature extremes.

The duty cycle may reach a maximum of 50% if the J input to the flip-flop is held continuously high. The feedback signal through resistor 18 is smoothed by a capacitor 31 and forces junction 16 to remain at circuit common potential.

Thus any change in input to the totalizer results in an imbalance at summing junction 16, this being converted in voltage-to-frequency converter 17 into an a-c signal which is amplified and demodulated. This action places a new input on comparator 26 which is balanced by a new duty cycle at $F_o$, which in turn re-establishes the proper summing junction potential via resistor 18, while producing an output frequency directly proportional to the input. In practice, frequency $F_o$ may be in a range of 0 to 5000 Hz or even higher. Thus frequency $F_o$ is relatively high at the high end of the current range.

Frequency $F_o$ is applied to the clock terminal of an adjustable binary scaling circuit or scaler 32 which has 16 binary bits and can therefore divide by any integer between 1 and 65535. The scaler is provided with sixteen switches $S_a$ to $S_p$ to select the desired scale-down factor. The inhibit terminal of scaler 32 is associated with an inhibit circuit constituted by variable resistor 33 in series with diode 34, this terminal being connected to common through a resistor 35 shunted by capacitor 36. This makes possible inhibition of the scaler when $F_o$ is less than a desired level. In one practical embodiment, the output of the scaler takes the form of a 0.04 sec pulse.

Pulses yielded by the scaler are fed to switch $S_4$ of a driver which, when actuated, applies power to the coil 37 of an electromechanical counter 38 having a digital readout 39. Power for the counter is derived from the voltage developed across zener diode 11 by means of a storage network formed by capacitors 40 and 41 and resistor 42. This network acts to store some of the energy required to pulse the counter while minimizing disturbances on the zener diode.

Counter 38 will only operate properly when the following relationship exists:

$$\text{voltage on diode 11} \div \left( \frac{\text{Resistance of coil 37}}{.04 \times \text{Freq.}_{counter}} \right) < (1_{in} - 4\text{mA})$$

For example, let us assume that the voltage across zener diode 11 is 6.2 volts, that counter coil 37 has a resistance of 23 ohms, and that the counter operates at 1 $H_z$ for a 20 mA input. Then 6.2 divided by 23 times 0.04 times 1 equals 10.78 mA. This is less than the available 16 mA and therefore will operate properly.

Instead of an electromechanical counter, use may be made of an electronic CMOS counter associated with an LCD display. Ample power exists within the constraints of the 4 mA idling current to operate this electronic counter to count pulses in the scaler output. It is desirable that a display of this type have a back-up battery available to retain the data in the event of a power failure.

A high frequency output is inherent to this totalizer system and can be over 5000 $H_z$ or more at full scale. This permits the use of a second counter gated by some time multiple of the crystal oscillator period so as to display 0% to 100% of full-scale output.

Square Root:

The totalizer also includes a square root circuit shown enclosed in block 40. When it is desired to select the square root of the input to the totalizer, jumper $J_1$ is withdrawn, thereby breaking the direct connection between the Q output of flip-flop 27 and resistor 18. A normally-retracted second jumper $J_2$ is then put in place, thereby interposing square root circuit 40 between the Q terminal and resistor 18.

When the square root circuit is operative, the $F_o$ output is applied to the (+) input terminal of a differential amplifier 41 through a resistor 42 and a smoothing capacitor 43. The output of amplifier 41 is modulated by electronic switches $S_5$ and $S_6$. Switch $S_5$ is driven at a rate determined by frequency $F_o$ taken from the Q terminal of flip-flop 27, whereas switch $S_6$ is driven by the complement frequency $\overline{F}_o$ taken from the $\overline{Q}$ terminal, thereby producing a signal representing the square of the duty cycle of $F_o$.

This signal is fed to the summing junction 16 through jumper $J_2$ and resistor 18 and is proportional to the square root of the input signal.

Figure 3:
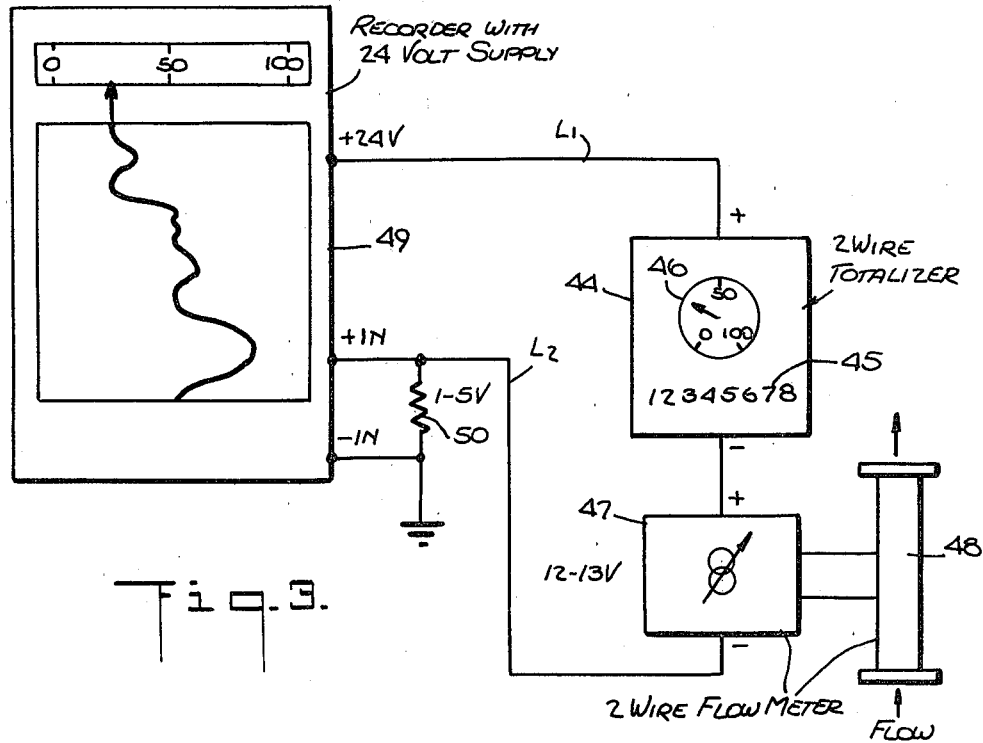
FIG. 3 is a block diagram showing how the totalizer is included in a two-wire transmitter.

Two-Wire Transmitter:

Referring now to FIG. 3, there is shown a two-wire transmitter which includes an electronic totalizer 44 in accordance with the invention which provides not only a digital readout 45 but also a percentage of scale readout 46.

The transmitter includes a primary transducer 47 which, in the example illustrated, is a flowmeter operatively coupled to a flow pipe 48 to measure the flow rate of liquid passing therethrough. The transducer is connected at the field station in series with the input circuit of totalizer 44 in the manner illustrated in FIG. 1, and is linked by an extended two-wire line $L_1$ and $L_2$ to a remote receiving station constituted by a recorder 49 and a 24-volt power supply.

Connected across the (+) and (−) input terminals of recorder 49 is a load resistor 50, the (−) input terminal being grounded, this being common to the negative terminal of the 24-volt power source. The +24V terminal of the power source is connected by line $L_1$ to the positive end of totalizer 44 whose negative end is connected to the positive end of transducer 47, the negative end of the totalizer going to the (+) input terminal of recorder 49. Load resistor 50 is therefore in series with the line and has a low ohmic value (i.e., 250 ohms) to provide a standardized voltage range of 1 to 5 volts d-c for operating the recorder. The recorder preferably has a high input impedance.

The totalizer input circuit has a low resistance and therefore has no perceptible effect on the normal operation of the transmitter. With this arrangement in which the power supply furnishes 24 volts, the voltage drop across totalizer 46 input circuit is 6 volts to provide operating voltage therefor, and that across transducer 47 is 12 or 13 volts to supply the necessary voltage.

While there has been shown and described a preferred embodiment of an electronic totalizer in accordance with the invention, it will be appreciated that many changes and modifications may be made therein without, however, departing from the essential spirit thereof.

I claim:

1. A totalizer usable in conjunction with a transducer responsive to a process variable such as flow rate to produce a varying current signal in a predetermined range, the totalizer providing a readout indicative of the time-integrated total of the process variable in units of measurement appropriate thereto which in the case of liquid flow rate may be liters, tons or other measuring units, said totalizer comprising:

A  input means to convert the current signal into a voltage signal proportional to the process variable;
   B  a voltage-to-frequency converter coupled to said input means for converting the voltage signal into pulses at a rate that is a function of the signal magnitude, the pulse frequency being relatively high at the upper limit of the range;
   C  a selectively adjustable digital scaler responsive to the converter pulses to provide output pulses at a scaled-down rate selected to yield the desired unit of measurement; said scaler being formed by a binary scaling circuit having a series of switches to select the desired scale-down factor, said binary scaling circuit having an inhibiting network connected thereto to prevent response to converter pulses representing a transducer current signal below said range; and
   D  a counter responsive to the scaler output pulses to provide said readout.

2. A totalizer as set forth in claim 1, further including means interposed between said converter and said scaler to derive the square root of said converter pulses.

3. A totalizer as set forth in claim 1, wherein said input means includes an input circuit formed by a zener diode in series with a fixed resistor connected across the transducer whereby the current signal produces a constant voltage drop across the diode providing power for operating the totalizer and the voltage drop across said resistor produces said voltage signal.

4. A totalizer as set forth in claim 3, wherein said converter includes an input modulator which converts said voltage signal into an a-c signal which is applied to an amplifier whose a-c output is demodulated in synchronism with said modulator.

5. A totalizer as set forth in claim 4, wherein said input modulator is constituted by two electronic switches actuated in phase opposition, one of said switches being actuated in accordance with a stable frequency derived from a crystal oscillator and the other by the complement of said stable frequency.

6. A totalizer as set forth in claim 5, wherein demodulation is effected by a third switch connected in the output of the amplifier and actuated in accordance with said complement frequency.

7. A totalizer as set forth in claim 6, wherein said converter pulses are generated by a flip-flop operated by clock pulses derived from said crystal oscillator.

8. A totalizer as set forth in claim 7, wherein said flip-flop is controlled by a comparator responsive to the demodulated voltage from the output of the amplifier.

9. A totalizer as set forth in claim 3, wherein said converter is an electromechanical counter whose coil is energized through a driver actuated by the scaler output pulses.

10. A totalizer as set forth in claim 9, wherein power for the coil is derived from a storage network coupled to said zener diode.

11. A totalizer as set forth in claim 1, wherein said counter is an electronic CMOS counter having an LCD display actuated by said scaler pulses.

* * * * *